J. W. EARL.
OSCILLATING DEVICE FOR MOTOR VEHICLE WIND SCREENS.
APPLICATION FILED NOV. 3, 1908.
988,448.
Patented Apr. 4, 1911.
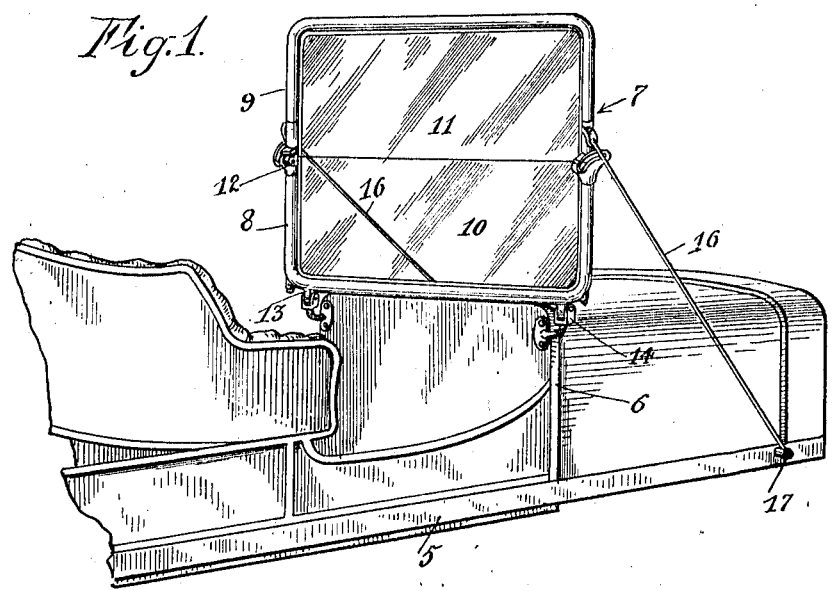
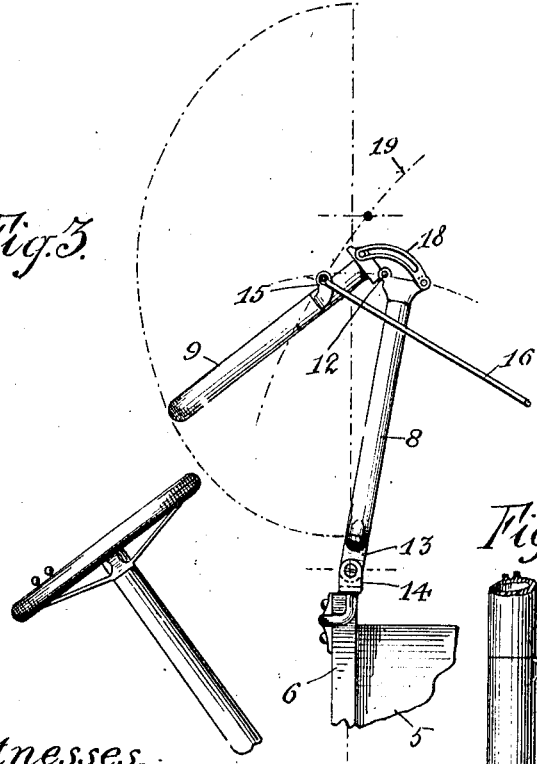
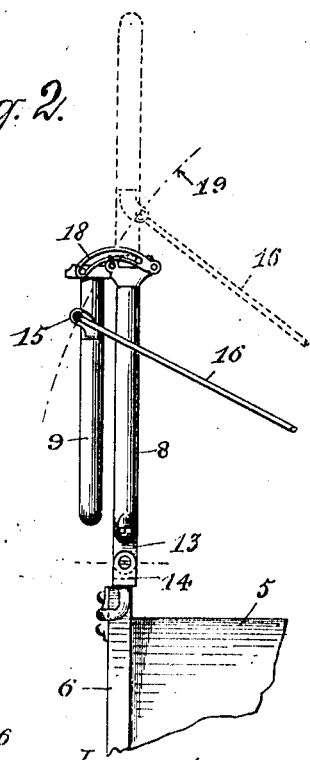
Witnesses,
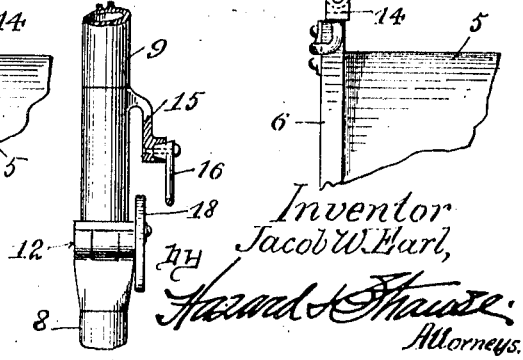
Inventor
Jacob W. Earl,
Attorneys.

UNITED STATES PATENT OFFICE.

JACOB W. EARL, OF LOS ANGELES, CALIFORNIA.

OSCILLATING DEVICE FOR MOTOR-VEHICLE WIND-SCREENS.

988,448. Specification of Letters Patent. Patented Apr. 4, 1911.

Application filed November 3, 1908. Serial No. 460,813.

*To all whom it may concern:*

Be it known that I, JACOB W. EARL, a citizen of the United States, residing at Los Angeles, in the county of Los Angeles and State of California, have invented new and useful Improvements in Oscillating Devices for Motor-Vehicle Wind-Screens, of which the following is a specification.

My invention has relation to a novel means of mounting folding screens on motor vehicles, and a prime object thereof is to provide a mounting which will enable the occupants of a motor car to which the screen is attached to obtain an unobstructed view in front of the car when the upper portion of the screen is in its lowered position.

In the mounting of wind screens on motor cars of various makes considerable difficulty has heretofore been experienced by manufacturers, as the steering wheels often interfere with the movement of the upper screen section, thus necessitating the adjustment of each screen to meet the varying requirements of the cars to which they are secured. For instance, in mounting a screen on a car whose steering wheel was placed at such an angle as to interfere with the movement of the upper section, the whole screen would have to be elevated to such an extent that when the upper section was lowered the folded sections would interfere with the view of the driver. Again, to avoid contact with the steering wheels the upper or folding section, is made of considerably less area than the lower to avoid contact with the steering wheels, and also to obviate the trouble of special mountings.

By the aid of my improved form of oscillating mounting the above recited troubles and inconveniences are largely obviated and I am enabled to provide a screen in which the areas of both sections are equal, thereby enabling the driver of the machine to obtain an unobstructed view in front of the moving vehicle.

In the accomplishment of the object of my invention, I have provided an oscillating divided tubular frame and a plurality of brace rods for rigidly maintaining the screen in either its folded or extended positions upon the motor dash.

In the accompanying drawings, forming a part of this specification:—Figure 1,— is a perspective view of my improved screen in place on a motor vehicle. Fig. 2,— is a side elevation of the screen, the upper section being folded upon the lower, the extended position of the upper section being shown in dotted lines. Fig. 3,— is a side elevation of the screen, the upper section being in a partially folded position, to illustrate the movement of the lower section during the folding operation. Fig. 4,— is an enlarged detail showing the method of connecting the brace rods to the upper section of the screen.

Referring now more particularly to the drawings, 5 designates a motor vehicle of usual pattern, to the dash 6 of which is secured my improved screen 7. This screen is preferably composed of a tubular frame divided into two sections 8 and 9, both of the sections being provided with glass panes 10 and 11. Upper section 9 of the screen is preferably secured to the lower section by means of pivots 12, the upper section being maintained in either of its vertical positions on the lower section by means of a suitable tension mechanism (not shown) preferably of the type illustrated in my joint application, S. N. 403,875, filed November 26, 1907. Lower section 8 is preferably provided with a plurality of downwardly extending lugs or ears 13, which are pivotally secured in bearings 14 rigidly secured to dash 6, thereby imparting to the section an oscillating motion on a movement of the upper section.

Upper section 9 of the screen is provided on each of the vertical portions of its tubular frame and at a point adjacent the ends thereof, with short curved arms 15 which curve forwardly when the upper section is in its raised position. These arms also are offset from the frame a sufficient distance to enable the brace rods 16, which are pivotally secured at their lower ends to the vehicle frame as at 17, to freely pass the curved slotted arms 18 of the tension mechanism without contacting therewith.

It will be apparent upon an examination of Fig. 3 of the drawings that by pivoting brace rods 16 on the upper frame at a point above the pivotal point of the two frames, and pivotally mounting the lower frame on the car, that the distance from the lower pivotal point 17 of rods 16, to their pivotal points on arms 15 will always be the same during the movement of the upper screen section on the lower, as the oscillation of the lower section forwardly, as clearly shown in Fig. 3, will compensate for the upward and downward movement of the upper frame, thus describing an arc of a circle from pivotal point 17 as clearly illustrated by the dotted line 19 in Fig. 3. It will also be noted from the foregoing description that by pivotally mounting the lower section of the screen on the vehicle, and pivotally attaching brace rods 16 to the vehicle frame and upper screen section, that in any downward movement of the upper section, both sections will be forced forwardly by the forward oscillation of the lower screen section, thus enabling me to mount screens whose sections are of equal areas on vehicles without contacting with the steering wheels, which are sometimes mounted in close proximity to their dashes. It will be noted by a reference to Fig. 2 of the drawings that when the upper screen section is in either of its extreme positions that the lower section will be rigidly maintained in a vertical position on the vehicle dash 6, the tension mechanism (not shown) arresting all vibratory movement of the screen. It will be further noted from the above description, that I have provided a novel folding screen mechanism whose upper section when folded on the lower will enable the motorist to obtain an unobstructed view ahead of the moving vehicle.

Having described my invention, what I claim as new and desire to secure by Letters Patent is:—

1. In a device of the class described, a wind screen divided into an upper section and a lower section hinged together, said screen being pivotally mounted on the motor vehicle, and brace rods pivotally secured to the vehicle frame and having a pivot connection with said upper section, said pivot connection being located at one side of the hinged edge of the upper section.

2. In a device of the class described, a wind screen comprising a lower section movably mounted at its lower edge and adapted to swing in a front and rear direction, an upper section having a hinge connection with the upper edge of said lower section adapted to assume an upright position above said lower section and adapted to swing in a rearward direction into a folded position behind said lower section, and brace rods having their forward ends attached to the frame of the motor vehicle and having their rear ends pivotally attached to said upper section at a point removed from said hinge connection whereby said lower section is drawn forwardly by said rods when said upper section swings to or from its folded position.

3. In a wind shield for vehicles, the combination of a lower section hinged to the vehicle, of an upper section hinged to the lower section, a brace rod, means connecting one end of the brace rod to the vehicle, and means connecting the other end of said brace rod to the upper section above the hinged edge thereof, whereby a turning movement of the upper section about its hinges causes a movement of the lower section about its hinges.

In witness that I claim the foregoing I have hereunto subscribed my name this 27th day of October, 1908.

JACOB W. EARL.

Witnesses:
EDMUND A. STRAUSE,
OLLIE PALMER.